US012256229B2

(12) United States Patent
Jiang et al.

(10) Patent No.: US 12,256,229 B2
(45) Date of Patent: **\*Mar. 18, 2025**

(54) METHOD AND DEVICES FOR SIGNALING TRANSMISSION IN UNLICENSED BAND

(71) Applicant: NEC Corporation, Tokyo (JP)

(72) Inventors: Lei Jiang, Beijing (CN); Hongmei Liu, Beijing (CN); Gang Wang, Beijing (CN); Chuangxin Jiang, Beijing (CN); Zhennian Sun, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/898,094

(22) Filed: Jun. 10, 2020

(65) Prior Publication Data

US 2020/0305005 A1 Sep. 24, 2020

Related U.S. Application Data

(63) Continuation of application No. 15/104,375, filed as application No. PCT/CN2014/087797 on Sep. 29, 2014, now Pat. No. 10,945,134.

(51) Int. Cl.
*H04W 16/14* (2009.01)
*H04W 72/23* (2023.01)
*H04W 74/0808* (2024.01)

(52) U.S. Cl.
CPC .......... *H04W 16/14* (2013.01); *H04W 72/23* (2023.01); *H04W 74/0808* (2013.01)

(58) Field of Classification Search
CPC .......... H04W 72/042; H04W 74/0808; H04W 16/14
See application file for complete search history.

(56) References Cited

U.S. PATENT DOCUMENTS 9,473,981 B2 * 10/2016 Bhushan ........... H04W 74/0816
9,801,207 B2 * 10/2017 Sergeyev .......... H04W 52/0254
(Continued)

FOREIGN PATENT DOCUMENTS

CN 101174851 A 5/2008
CN 101404794 4/2009
(Continued)

OTHER PUBLICATIONS

International Search Report and Written Opinion mailed Jun. 29, 2015, in corresponding PCT International Application.
(Continued)

*Primary Examiner* — Asghar H Bilgrami
(74) *Attorney, Agent, or Firm* — Sughrue Mion, PLLC

(57) ABSTRACT

Embodiments of the present invention provide method and devices for signaling transmission in unlicensed band. The method comprising determining a signal transmission pattern, which defines time and frequency resources for transmitting at least one signal in a first frequency band; signaling, via a second frequency band, the signal transmission pattern to a first device; and transmitting the at least one signal via the first frequency band, to the first device, according to the signal transmission pattern; wherein a transmission of one of the at least one signal is skipped if time and frequency resource for the transmission defined by the signal transmission pattern is detected as busy. Corresponding methods and devices for receiving a signal which is transmitted using above method are also disclosed.

12 Claims, 6 Drawing Sheets

(56) References Cited

U.S. PATENT DOCUMENTS

| | | | |
|---|---|---|---|
| 2010/0020711 A1 | 1/2010 | Horisaki et al. | |
| 2012/0077510 A1* | 3/2012 | Chen | H04W 28/26 |
| | | | 455/452.1 |
| 2013/0163447 A1 | 6/2013 | Koskela et al. | |
| 2013/0294356 A1* | 11/2013 | Bala | H04W 16/14 |
| | | | 370/329 |
| 2014/0140314 A1 | 5/2014 | Wei et al. | |
| 2014/0342745 A1* | 11/2014 | Bhushan | H04W 24/02 |
| | | | 455/450 |
| 2014/0376483 A1* | 12/2014 | Hong | H04W 16/14 |
| | | | 370/329 |
| 2014/0378157 A1* | 12/2014 | Wei | H04W 72/1215 |
| | | | 455/454 |
| 2015/0085841 A1* | 3/2015 | Sadek | H04J 3/16 |
| | | | 370/336 |
| 2015/0131536 A1 | 5/2015 | Kaur et al. | |
| 2015/0263837 A1* | 9/2015 | Patel | H04W 72/0453 |
| | | | 370/329 |
| 2015/0296385 A1* | 10/2015 | Zhang | H04W 72/1263 |
| | | | 370/329 |
| 2016/0037560 A1* | 2/2016 | Liu | H04B 7/088 |
| | | | 370/329 |
| 2016/0050698 A1* | 2/2016 | Siomina | H04W 76/14 |
| | | | 370/329 |
| 2016/0278096 A1* | 9/2016 | Watfa | H04W 48/08 |
| 2017/0303220 A1* | 10/2017 | Sadeghi | H04W 72/0453 |

FOREIGN PATENT DOCUMENTS

| | | |
|---|---|---|
| CN | 101404797 A | 4/2009 |
| CN | 102202028 A | 9/2011 |
| CN | 103370896 A | 10/2013 |
| JP | 2014 72694 | 4/2014 |
| JP | 2014-509148 | 4/2014 |
| WO | WO 2013/010323 A | 1/2013 |
| WO | WO 2014 020996 A1 | 2/2014 |

OTHER PUBLICATIONS

Notification of Transmittal of the International Search Report and the Written Opinion of the International Searching Authority, or the Declaration mailed Jun. 29, 2015, in corresponding PCT International Application.

Notification of Second Office Action dated Sep. 18, 2019, issued by The Patent Office of The People's Republic of China in counterpart Chinese Patent Application No. 201480075058.0.

Patent Search Report issued by The Patent Office of The People's Republic of China in counterpart Chinese Patent Application No. 201480075058.0.

Office Action dated Oct. 23, 2019, issued by the European Patent Office in counterpart European Patent Application No. 14 903 443.1.

3GPP TSG-RAN WG1 #62 Aug. 23-27, 2010 Madrid, Spain, R1-104797, 6.3.2.1, Qualcomm Incorporated Signaling and Configuration of CSI-RS, Discussion.

Office Action dated Feb. 25, 2019, issued by the European Patent Office in counterpart European Patent Application No. 14 903 443.1.

Notification of First Office Action dated Oct. 31, 2018, issued by The Patent Office of The People's Republic of China in counterpart Chinese Patent Application No. 201480075058.0.

Notification of Reasons for Refusal dated Jan. 30, 2018, issued by the Japanese Patent Office (JPO) in counterpart Japanese Patent Application No. 2016-540526.

Extended European Search Report dated mailed, Jun. 20, 2017, by the European Patent Office in counterpart European Patent Application No. 14903443.1.

Notification of Reasons for Refusal mailed Jan. 31, 2017, by the Japanese Patent Office in counterpart Japanese Patent Application No. 2016-540526.

Nokia Networks, Nokia Corporation, "On LTE LAA functionalities facilitating co-existence", 3GPP TSG-RAN WG1#78b R1-144185, pp. 1-6, Website <URL:http://www.3gpp.org/ftp/tsg_ran/WG1_RL 1/TSGR1_78b/Docs/R1-144185.zip>, Sep. 27, 2014.

LG Electronics, "Candidate solutions for LAA operation", 3GPP TSG-RAN WG1#78b R1-144042, pp. 1-8, Website <URL:http://www.3gpp.org/ftp/tsg_ran/WG1_RL 1/TSGR1_78b/Docs/R1-144042.zip>, Sep. 27, 2014.

Huawei, HiSilicon, "Review of existing unlicensed spectrum regulatory requirements affecting physical layer design", 3GPP TSG-RAN WG1#78b R1-143724, pp. 1-10, Website <URL:http://www.3gpp.org/ftp/tsg_ran/W G1_RL 1/TSGR1_78b/Docs/R1-143724.zip>, Sep. 27, 2014.

NTT Docomo, "Japanese regulatory requirements in 5 GHz band", 3GPP TSG-RAN WG1 #78b R1-144148, pp. 1-5, Website<URL:http://www.3gpp.org/ftp/tsg_ran/WG1_RL 1 /TSGR1_78b/Docs/R1 - 144148.zip>, Sep. 27, 2014.

Notification of Reasons for Refusal mailed Jun. 27, 2017, by the Japanese Patent Office in counterpart Japanese Patent Application No. 2016-540526.

Hitachi Ltd., "Design targets for LAA using LTE" [online], 3GPP TSG RAN WG1 #78bis, R1-144221, the internet, <URL:http://www.3gpp.org/ftp/tsg_ran/WG1_RL1/TSGR1_78b/Docs/R1-144221.zip>, pp. 1-4, Sep. 27, 2014.

Intel Corporation, "Design Targets for LAA using LTE", [online], 3GPP TSG RAN WG1 #78bis, R1-143775, the internet, <URL:http://www.3gpp.org/ftp/tsg_ran/WG1_RL1/TSGR1_78b/Docs/R1-143775.zip>, pp. 1-4, Sep. 27, 2014.

NTT Docomo, "Inter-operator and Inter-RAT co-existence techniques for LAA using LTE", [online], 3GPP TSG RAN WG1 #78bis, R1-144150, the internet, <URL:http://www.3gpp.org/ftp/tsg_ran/WG1_RL1/TSGR1_78b/Docs/R1-144150.zip>, pp. 1-6, Sep. 27, 2014.

Qualcomm Incorporated, "Solutions for required functionalities and design targets", [online], 3GPP TSG RAN WG1 #78bis, R1-144000, the internet, <URL:http://www.3gpp.org/ftp/tsg_ran/WG1_RL1/TSGR1_78b/Docs/R1-144000.zip>, pp. 1-5, Sep. 27, 2014.

Nokia Networks, Nokia Corporation, "On LTE LAA functionalities facillating co-existence" [online], 3GPP TSG RAN WG1 #78bis, R1-144185, the internet, <URL:http://www.3gpp.org/ftp/tsg_ran/WG1_RL1/TSGR1_78b/Docs/R1-144185.zip>, 4 pages, Sep. 27, 2014.

LG Electronics, "Candidate Solutions for LAA Operation", [online], 3GPP TSG RAN WG1 #78bis, R1-144042, the internet, <URL:http://www.3gpp.org/ftp/tsg_ran/WG1_RL1/TSGR1_78b/Docs/R1-144042.zip>, 6 pages, Sep. 27, 2014.

Indian Examination Report (Office Action) dated Dec. 12, 2019, issued in counterpart Indian Patent Application No. 201647018324.

Chinese Office Action and Search Report dated Sep. 18, 2019, issued in counterpart Chinese Patent Application No. 201480075058.0.

EP Office Action dated Oct. 6, 2020, issued by the European Patent Office in counterpart European Patent Application No. 14 903 443.1.

* cited by examiner

500

METHOD AND DEVICES FOR SIGNALING TRANSMISSION IN UNLICENSED BAND

CROSS-REFERENCE TO RELATED PATENT APPLICATIONS

This application is a continuation of U.S. patent application Ser. No. 15/104,375, filed Jun. 14, 2016, which is a National Stage Entry of International Application No. PCT/CN2014/087797, filed Sep. 29, 2014. The entire contents of the above-referenced applications are expressly incorporated herein by reference.

FIELD OF THE INVENTION

Example embodiments of the present invention relate generally to the wireless communication, and more specifically, to method and apparatus for signaling transmission in unlicensed band.

BACKGROUND OF THE INVENTION

In wireless communication, the demand for high data rate keeps increasing and Long Term Evolution (LTE) developed by the third generation project partnership (3GPP) has been shown to be an extremely successful platform to meet such demand. In recent years, LTE has been widely deployed in many different countries/regions. LTE system has been designed to operate in dedicated and licensed frequency band to avoid interference with other systems and to guarantee satisfying communication performance. However, with the demand for high data rate keeps increasing and at the same time available licensed frequency resources shrinks, more and more cellular network operators begin to consider seriously utilization of the unlicensed spectrum as a complimentary tool to augment their service offering.

One alternative way for utilizing an unlicensed band is called "Licensed-Assisted Access", which means the utilization of the unlicensed band is under control from the licensed band, e.g., an unlicensed band is configured as a secondary component carrier while a licensed carrier is configured to be primary component carrier. Such a deployment scenario enables operators and vendors to maximally leverage the existing or planned investments in LTE/EPC (Evolved Packet Core) hardware.

However, unlicensed band is not a dedicated band for cellular network use, and on the contrary, it is shared by various wireless communication systems including Wi-Fi. To avoid/reduce interferences between the various wireless communication systems, in some countries, access technologies employed in unlicensed band need to abide to certain regulations, e.g., Listen-Before-Talk (LBT), and channel bandwidth occupancy requirements. Fair coexistence between LTE and other technologies, such as Wi-Fi, as well as between different LTE operators appears necessary.

To comply with the regulations for unlicensed band, current cellular wireless communication techniques, e.g., LTE, have to be modified, if to be deployed in the unlicensed band; and at the same time current design for these communication techniques and corresponding numerologies should be reused as much as possible to reduce the cost of the product and the effort for standardization.

The following meanings for the abbreviations used in this specification apply:
AP Access point
BS Base Station
CRS Cell-specific Reference Signal
CSI-RS Channel state Information Reference Signal
eNB Evolved Node B
GSM Global system for mobile communications
LBT Listen before talk
LTE Long Term Evolution
MIB Master Information Block
PSS Primary Synchronization Signal
SF Subframe
SIB System Information Block Type 1
SSS Secondary Synchronization Signal
TDM Time Division Multiplexing
UE User Equipment
SFN System Frame Number
WCDMA Wideband Code Division Multiple Access

SUMMARY OF THE INVENTION

To enable basic detection and measurements in unlicensed band, thus facilitate employing unlicensed band resources for cellular communication use, and at the same time allow fair utilization of the shared resources by different wireless systems, methods and apparatus have been provided herein.

Various embodiments of the invention aim at addressing at least part of the above problems and disadvantages. Other features and advantages of embodiments of the invention will also be understood from the following description of specific embodiments when read in conjunction with the accompanying drawings, which illustrate, by way of example, the principles of embodiments of the invention.

Various aspects of embodiments of the invention are set forth in the appended claims and summarized in this section. It shall be noted that the protection scope of the invention is only limited by the appended claims.

According to a first aspect of the invention, embodiments of the present invention provide a method for signal transmission in a wireless communication network, the method comprises determining a signal transmission pattern, which defines time and frequency resources for transmitting at least one signal in a first frequency band; signaling, via a second frequency band, the signal transmission pattern to a first device; and transmitting the at least one signal via the first frequency band to the first device, according to the signal transmission pattern, wherein transmission of any of the at least one signal is skipped if the time and frequency resource for its transmission defined by the signal transmission pattern is detected as busy.

In accordance with one embodiment of the invention, the method further comprises performing channel detection in the first frequency band before transmitting each of the at least one signal, and determining whether to skip a transmission of one of the at least one signal based on the channel detection results.

In accordance with another embodiment of the invention, determining whether to skip a transmission of one of the at least one signal based on the channel detection results includes skipping a transmission of one of the at least one signal if the time and frequency resource for its transmission is detected as busy, and continuing the channel detection in the time and frequency resource corresponding to the skipped transmission.

According to one further embodiment of the invention, the signal transmission pattern defines time and frequency resources for one of a periodic transmission, an opportunistic transmission, and a combination thereof.

In accordance with another embodiment of the invention, the at least one signal includes at least one of a reference signal, a synchronization signal, and a control signaling.

In accordance with still another embodiment of the invention, the time and frequency resource for the transmission of the one of the at least one signal is detected as busy when received signal power on the same frequency resource is above a threshold, the threshold is configurable, determined based on a receiver sensitivity, or fixed.

In accordance with one further embodiment of the invention, the method further comprises determining whether to adopt a listen before talk (LTB) operating mode in the first frequency band; and performing the steps of determining, signaling, transmitting and skipping only when the listen before talk mode is determined to be adopted. In accordance with one embodiment of the invention, determining whether to adopt a listen before talk (LTB) operating mode in the first frequency band is based on regulation for the first frequency band and/or the device's capability, e.g., whether a eNB is capable of LBT operation.

In still another embodiment of the invention, the first frequency band is an unlicensed frequency band and the second frequency band is a licensed frequency band.

In accordance with one embodiment of the invention, the first frequency band and/or the second frequency band comprise(s) multiple carriers. In accordance with another embodiment of the invention, at least one carrier in the first frequency band and at least one carrier in the second frequency band are configured for the first device as carrier aggregation or dual connectivity.

In accordance with one embodiment of the invention, the operations of determining a signal transmission pattern and signaling the signal transmission pattern to the first device are performed by a second device, while transmitting the at least one signal via the first frequency band to the first device is performed by a third device different from the second device.

According to a second aspect of the invention, embodiments of the present invention provide a method for signal reception in a wireless communication network, the method comprises receiving, via a second frequency band, a configuration signaling indicating a signal transmission pattern to be used in a first frequency band, wherein the signal transmission pattern defines time and frequency resources for transmitting at least one signal; and receiving the at least one signal via the first frequency band, according to the signal transmission pattern.

In accordance with one embodiment of the invention, the signal transmission pattern defines time and frequency resources for one of a periodic transmission, an opportunistic transmission, and a combination thereof.

In accordance with another embodiment of the invention, the at least one signal includes at least one of a reference signal, a synchronization signal, and a control signaling.

In some embodiments of the invention, the first frequency band is an unlicensed frequency band and the second frequency band is a licensed frequency band.

In accordance with one embodiment of the invention, the first frequency band and/or the second frequency band comprise(s) multiple carriers. In accordance with another embodiment of the invention, at least one carrier in the first frequency band and at least one carrier in the second frequency band are configured for a device as carrier aggregation or dual connectivity.

In accordance with one further embodiment of the invention, the configuration signaling is received from a first apparatus, while the at least one signal is received from a second apparatus different from the first apparatus.

According to a third aspect, embodiment of the present invention provides a corresponding device which implements the methods described in the first aspect.

According to a fourth aspect, embodiments of the present invention provide a corresponding device which implements the methods described in the second aspect.

BRIEF DESCRIPTION OF THE DRAWINGS

The above and other aspects, features, and benefits of various embodiments of the invention will become more fully apparent, from the following detailed description and the accompanying drawings, in which like reference numerals refer to the same or similar elements. The drawings are illustrated for facilitating better understanding of the embodiments of the disclosure and not necessarily drawn to scale, in which.

DETAILED DESCRIPTION OF EMBODIMENTS

Some preferred embodiments will be described in more detail with reference to the accompanying drawings, in which the preferred embodiments of the present disclosure have been illustrated. However, the present disclosure can be implemented in various manners, and thus should not be construed to be limited to the embodiments disclosed herein. On the contrary, those embodiments are provided for thorough and complete understanding of the present disclosure, and completely conveying the scope of the present disclosure to those skilled in the art.

In the following description, numerous specific details of embodiments of the present invention are set forth. However, it is understood that embodiments of the invention may be practiced without these specific details. In other instances, well-known circuits, structures and techniques have not been shown in detail in order not to obscure the understanding of this description. Those of ordinary skills in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. It shall be understood that the singular forms "a", "an" and "the" include plural referents unless the context explicitly indicates otherwise.

Figure 1:
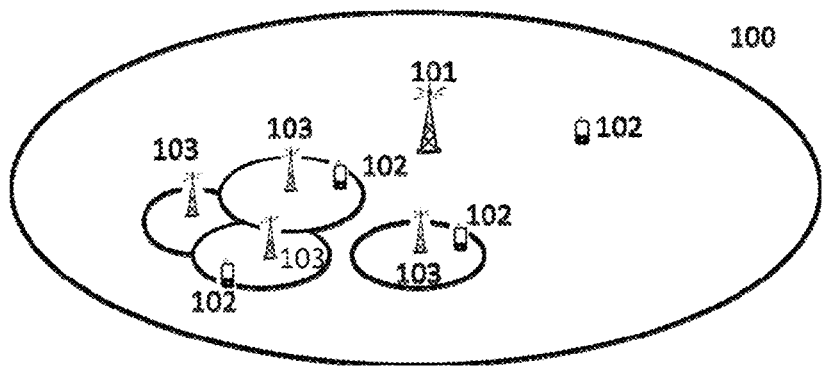
FIG. 1 is a schematic diagram of wireless network where an embodiment of the invention can be implemented.

Reference is now made to FIG. 1 which is a diagram of an example wireless network scenario where a method according to an embodiment of the present invention can be applied. The wireless network 100 comprises one or more network nodes 101 and 103, here in the form of evolved Node B, also known as eNode Bs or eNBs, or pico eNB, femto eNB. The network nodes 101 could also be in the form of Node Bs, BTSs (Base Transceiver Stations), BS (Base Station) and/or BSSs (Base Station Subsystems), etc. The network nodes 103 may operate with different radio access technology (RAT) and/or in different frequency band than that of network node 101. For example, the network node 103 may be a Wi-Fi access point (AP) operating in unlicensed band, while network node 101 is a LTE eNB operating in licensed band. In another example, both the network node 101 and 103 operate in a licensed frequency band, but using different carriers. It should be noted that it is also possible for both network node 101 and 103 to operate in same carrier. The network nodes 101 and 103 provide radio connectivity to a plurality of user equipments (UEs) 102. The term user equipment is also known as mobile communication terminal, wireless terminal, mobile terminal, user terminal, user agent, machine-to-machine devices etc., and can be, for example, what today is commonly known as a mobile phone or a tablet/laptop with wireless connectivity or fixed mounted terminal. Moreover, the UEs 102 may, but do not need to, be associated with a particular end user. Though for illustrative purpose, the wireless network 100 is described to be a 3GPP LTE network, the embodiments of the present invention are not limited to such network scenarios and the proposed methods and devices can also be applied to other wireless networks, e.g., a GSM or a WCDMA network.

In the network 100 depicted in FIG. 1, the network nodes, e.g., eNB 101 may firstly provide service to the UEs 102 via a carrier C1 in a frequency band B1, and then when more frequency resources are required to serve an increased number of UE, or to provide an increased throughput, the eNB 101 may provide service to UEs 102 via another carrier C2 in another frequency band B2, e.g., by using carrier aggregation (CA); or the eNB 101 may provide service to UEs 102 together with another network node, e.g., a pico eNB 103 which operates in another carrier C2 in another frequency band B2, by using dual connectivity. In a CA scenario specified by 3GPP LTE Release 10, a UE can be configured with multiple carriers, with each carrier provided by a different network node, or with both carriers provided by same network node. The multiple carriers can belong to same or different frequency bands. Among the configured multiple carriers, one carrier is designated as primary component carrier (PCC), while others are called secondary component carriers (SCCs). In a dual connectivity scenario under discussion in 3GPP LTE for Release 12, a given UE consumes radio resources provided by at least two different network points connected with non-ideal backhaul. Furthermore, each eNB involved in the dual connectivity for a UE may assume different roles, i.e., one eNB serves as master eNB, while others serve as secondary eNBs. Those roles do not necessarily depend on the eNB's power class and can vary among UEs. Generally, a primary cell/master eNB should operate in a licensed band to guarantee accurate signaling transmission, while the secondary cell/eNB can be either licensed or unlicensed band.

In either CA or dual connectivity scenarios described above, in case the second band B2 is a frequency band to be shared with other wireless network or another cell, e.g., the second band B2 is an unlicensed band and is shared by the eNB 101 with another Wi-Fi AP 103, the communication between the eNB 101 and the UEs 102 via the carrier C2 in the frequency band B2 may need to avoid interference to/from other networks/cells. In another example, the second band B2 can be an licensed band shared by some pico eNBs 103, and in such case, when utilizing the second band B2 (e.g., using dual connectivity technique with eNB 101 as master eNB operating in the carrier C1 and a pico eNB 103 as secondary eNB operating in the carrier C2), interference to/from other network nodes/cells should also be taken into account. In the embodiments of the invention, methods and devices are provided to enable communication in a shared frequency band which guarantees little interference to/from other wireless network/cells.

Figure 2A:
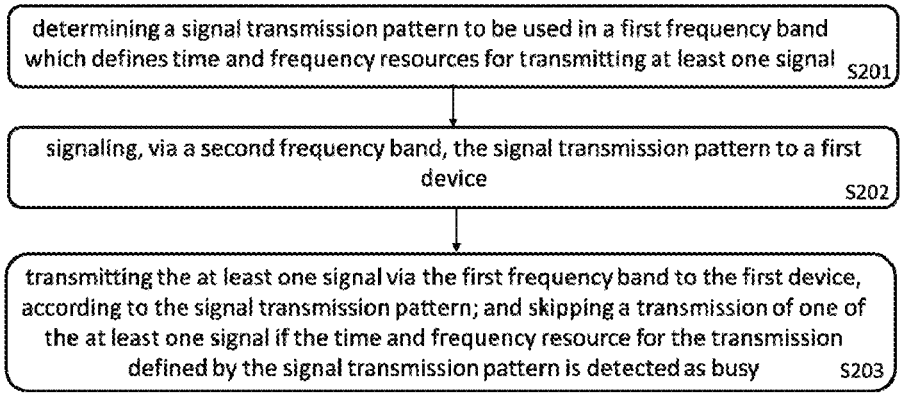
FIG. 2a is a flow chart of a method for signal transmission in a wireless communication network according to an embodiment of the invention.

Reference is now made to FIG. 2a which illustrates a flow chart for an example method 200 for transmitting signal in a wireless network. The method 200 comprises a step S201, for determining a signal transmission pattern which defines time and frequency resources for transmitting at least one signal in a first frequency band; a step S202, for signaling via a second frequency band the signal transmission pattern to a first device (e.g., UE 102 shown in FIG. 1); a step S203, for transmitting the at least one signal via the first frequency band, to the first device, according to the signal transmission pattern which is determined in the step S201 and signaled to the UE 102 in the step S202, and skipping a transmission of one of the at least one signal if time and frequency resource for the transmission defined by the signal transmission pattern is detected as busy.

In one embodiment of the invention, the first frequency band is an unlicensed frequency band and the second frequency band is a licensed frequency band, but the invention is not limited to this. It can be appreciated that in another embodiment of the invention, both the first frequency band and the second frequency band can be licensed frequency bands, e.g., the first frequency band is a shared frequency band with other cells and serves as a secondary carrier, while the second frequency band serves as primary carrier; and in still another embodiment of the invention, they both can be unlicensed band. In accordance with one embodiment of the invention, the first frequency band and/or the second frequency band comprise(s) multiple carriers. In accordance with another embodiment of the invention, at least one carrier in the first frequency band and at least one carrier in the second frequency band are configured for the first device as carrier aggregation or dual connectivity.

In one embodiment of the invention, the at least one signal transmitted in the step S203 includes at least one of a reference signal, a synchronization signal, and a control signal. For example, the at least one signal can be a CRS or a CSI-RS, a PSS and SSS, or some common control signaling like system information.

In one embodiment of the invention, the signal transmission pattern defines time and frequency resources for one of the following transmissions: a periodic transmission, an opportunistic transmission, and a combination thereof.

Figure 3A:
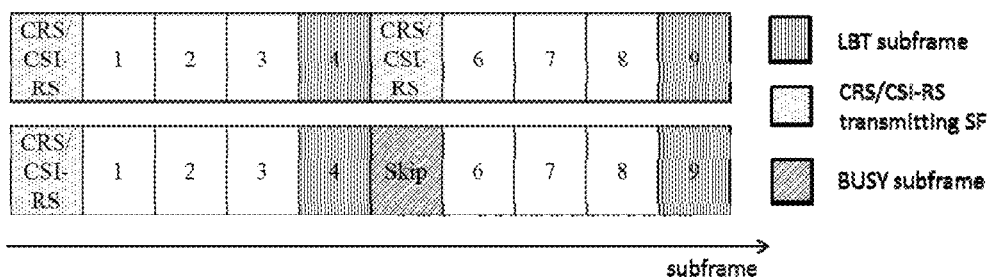
FIG. 3a-3f are examples of the signal transmission patterns and corresponding channel detection according to an embodiment of the invention.

In FIGS. 3a-3f, some examples of the signal transmission patterns are provided. In the example of FIG. 3a, it is assumed that a CRS/CSI-RS signal is transmitted periodically in the step S203 according to a signal transmission pattern determined for it in the step S201. As shown in FIG. 3a, the signal transmission pattern defined for the CRS/CSI-RS indicates in which subframe the CRS/CSI-RS should be transmitted. For example, the signal transmission pattern may indicate a transmission period (e.g., 5 ms in this example) and a subframe offset for transmitting the CRS/CSI-RS. With respect to the frequency resources to be used for transmitting the CRS/CSI-RS, it can be predefined, or also indicated by the signal transmission pattern, e.g., via a carrier index or a channel index. In this example, the CRS/CSI-RS is expected to be transmitted in subframes 0 and 5; however, in subframe 4, the first frequency band is detected to be busy, and thus the transmission of the corresponding CRS/CSI-RS in subframe 5 is skipped.

Figure 3B:
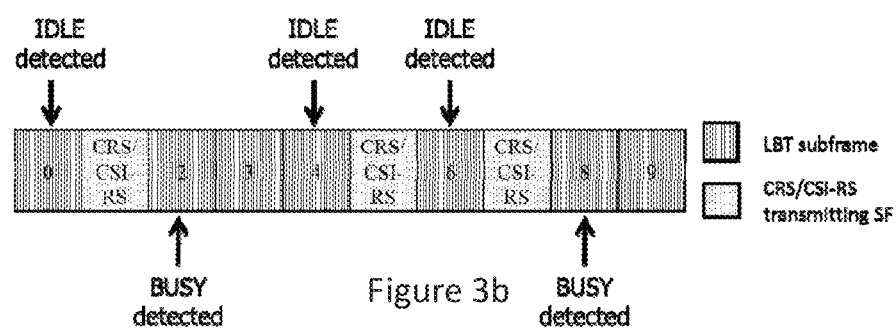

In FIG. 3b, an example of opportunistic transmission of the CRS/CSI-RS signal is illustrated. That is, before each transmission of the CRS/CSI-RS, a listen before talk (LBT) is performed to detect whether the channel to be used for the transmission is busy or not. In an embodiment of the invention, the detection is performed in each available subframe where there is no concurrent transmission scheduled in the same frequency band, and the CRS/CSI-RS is transmitted in next subframe whenever the channel is detected as idle. If the corresponding channel is detected as busy in a subframe, then continue performing the LBT in the next subframe instead of transmitting the CRS/CSI-RS. As a result, the CRS/CSI-RS is sent aperiodically. In the example shown in FIG. 3b, the eNB detects the channel in the first frequency band (e.g., an unlicensed band) in subframe 0, and finds it idle, and as a result the CRS/CSI-RS is transmitted in the following subframe 1; then before transmitting next CRS/CSI-RS, the channel detection is performed again in subframe 2, and the channel is detected as busy. It means transmission of the CRS/CSI-RS is not allowed in subframe 3, and then the channel detection continues till the channel is detected as idle in subframe 4. As a result, the CRS/CSI-RS is transmitted in subframe 5. The opportunistic transmission as shown in FIG. 3b as an example provides more chance for CRS/CSI-RS transmission at the cost of more frequent channel detection.

In another embodiment of the invention, the signal transmission pattern determined in the step S201 may define time and frequency resources for a combination of periodical and opportunistic transmission to balance between signaling overhead and CSI precision. In one embodiment of the invention, the periodical and opportunistic transmission patterns can be arranged in TDM way, e.g., when channel in the unlicensed band changes slowly, or the idle channel is easy to be obtained, periodical transmission can be applied; and when the channel in the unlicensed band changes quickly, or the channel is busy in most of the time, opportunistic transmission can be a better choice. Other factors, such as scheduling information of adjacent cells, or, assisting information on transmission characteristic of a Wi-Fi AP which shares the first frequency band with the eNB, can also be considered to determine a proper signal transmission pattern in step S201.

Figure 3C:
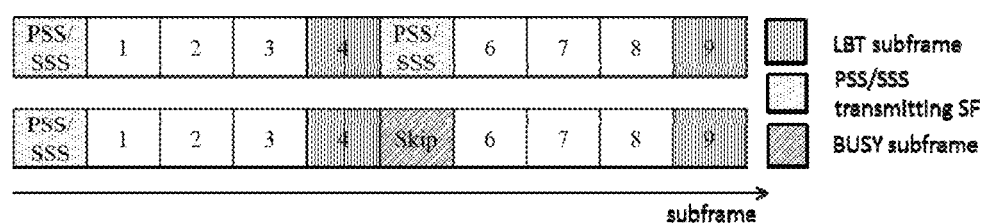
Figure 3D:
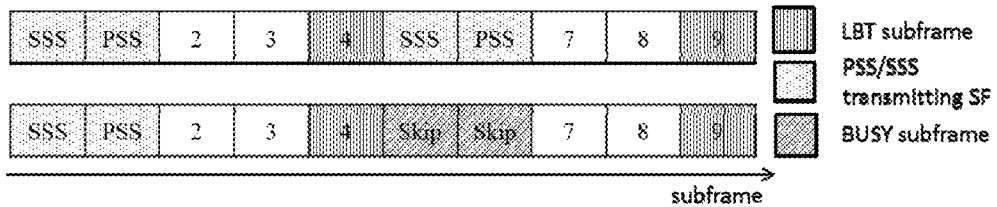

In FIGS. 3c and 3d, another two examples of the signal transmission pattern are provided, with FIG. 3c for FDD system and FIG. 3d for TDD system. In these examples, it is assumed that the at least one signal to be transmitted in the step S203 is synchronization signals comprising PSS and SSS. The determined signal transmission patterns in FIG. 3c and FIG. 3d for PSS/SSS are consistent with current LTE-FDD and LTE-TDD specification respectively to reuse the design of current LTE system, however, it should be noted that such patterns are just presented as examples and the embodiments of the invention are not limited to this. As shown in FIG. 3c, for FDD system, both the PSS and SSS are transmitted in subframes 0 and 5, and according to an embodiment of the invention, the LBT is performed one subframe before each transmission of the PSS/SSS, i.e., the LBT is performed in subframe 9 of previous radio frame and subframe 4 in current frame. It can be appreciated that the channel detection can also be performed in other subframes than that shown in FIG. 3c, e.g., it can be executed 2 subframes before each PSS/SSS transmission. FIG. 3d illustrates the signal transmission pattern for a LTE-TDD system, where the PSS is transmitted in subframes 1 and 6, and SSS is transmitted in subframes 0 and 5 in each radio frame. The channel detection (or, LBT) is shown to be performed in the same subframes as shown in FIG. 3c, however, it can be appreciated that the invention is not limited to this.

In accordance with one embodiment of the invention, the time and frequency resource for the transmission of the one of the at least one signal is detected as busy when received signal power on the same frequency resource is above a threshold, the threshold is configurable, determined based on a receiver sensitivity, or fixed. In an embodiment of the invention, the threshold can be determined by eNB receiver sensitivity. In another embodiment of the invention, the threshold can be fixed, e.g., be set to be −62 dBm as in 802.11.

Figure 2B:
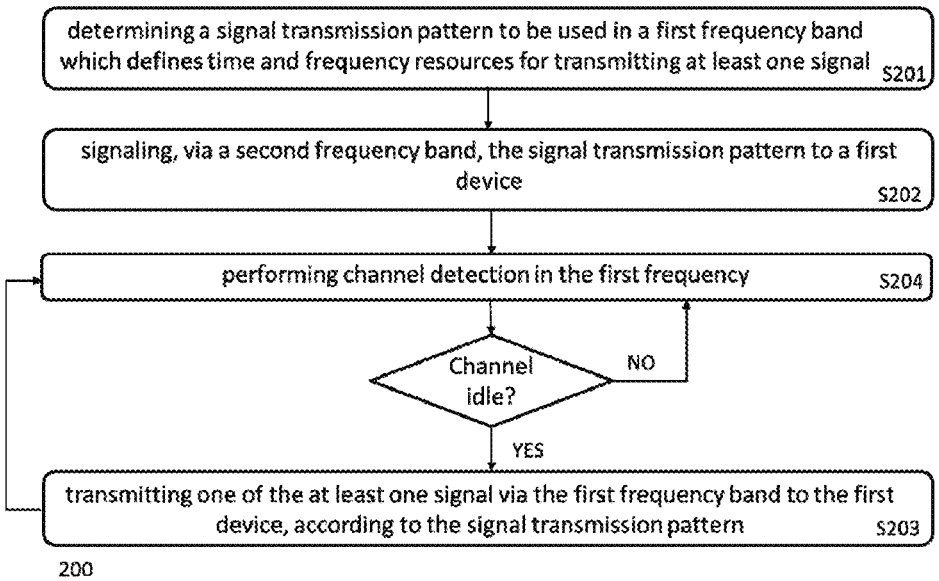
FIG. 2b is a flow chart of a method for signal transmission in a wireless communication network according to another embodiment of the invention.

In accordance with another embodiment of the invention, the channel detection described above is performed in an additional step S204, for performing channel detection in the first frequency band before transmitting each of the at least one signal in the step S203, and for determining whether to skip a transmission of one of the at least one signal based on the channel detection results, as shown in FIG. 2b. In accordance with another embodiment of the invention, only the latest channel detection results is taken into account during determining, and in another embodiment of the invention, both the channel detection results and some other estimation are considered during determining, e.g., an estimation for the maximum duration of an interfering transmission from, e.g., a Wi-Fi station.

In another embodiment of the invention, the channel detection step S204 is not executed before each transmission. Instead, the channel detection provides a prediction on a time duration unavailable/available for the signal transmission. That is, if the channel detection indicates that a channel in the first frequency band will be idle for a period of P ms, then a signal can be transmitted according to the signal transmission pattern within the P ms without additional channel detection between each transmission. In case the channel detection indicates that the first frequency band keep busy for a period of P ms, then all the transmission of a signal defined the signal transmission pattern within the P ms will be skipped, without additional channel detection before each skipping.

In still another embodiment of the invention, the channel detection step S204 may be performed by a separate device rather than an eNB which performs the steps S201 to S203. For example, the channel detection can be done by a UE, which report the detection results to the eNB based on certain configuration. In a further embodiment, the channel detection may be performed by a Wi-Fi Station or AP connected to the eNB which performs the steps S201 to S203. In such case, the method may further include a receiving step not shown in FIGS. 2a-2c, for receiving the channel detection results for the first frequency band. In still another embodiment of the invention, the steps S203 and S204 are performed by a pico eNB 103, while the steps S201 and S202 are performed by a macro eNB 101, the wherein the pico eNB 103 and the macro eNB 101 provide service to a UE via CA or dual connectivity.

In accordance with still another embodiment of the invention, determining whether to skip a transmission of one of the one or more signals based on the channel detection results includes skipping a transmission of one of the one or more signals if the corresponding channel is detected as busy, and continuing the channel detection in the corresponding time-frequency resource for the skipped transmission defined by the signal transmission pattern. That is, in FIG. 3d, if the channel is detected as busy in subframe 4, then in the following subframes 5 and 6, the PSS and SSS are not allowed to be transmitted, and correspondingly, the channel detection may continue in the subframes 5 and 6. However, if the subframes 5 and 6 are detected as idle and the PSS and SSS are scheduled there, the channel detection should be avoided in same subframes. The reason is that, to avoid in-device interference and reduce implementation complexity, concurrent transmission and reception in same frequency band should be prevented. Correspondingly, when signal is being transmitted in the first frequency band, the channel detection is not allowed in same frequency band; on the other hand, once the channel is detected as busy and the signal is not allowed to be transmitted, i.e., a transmission defined by the signal transmission pattern will be skipped, the subframe corresponding to the skipped transmission can be used for channel detection, according to the embodiment of the invention.

Figure 3E:
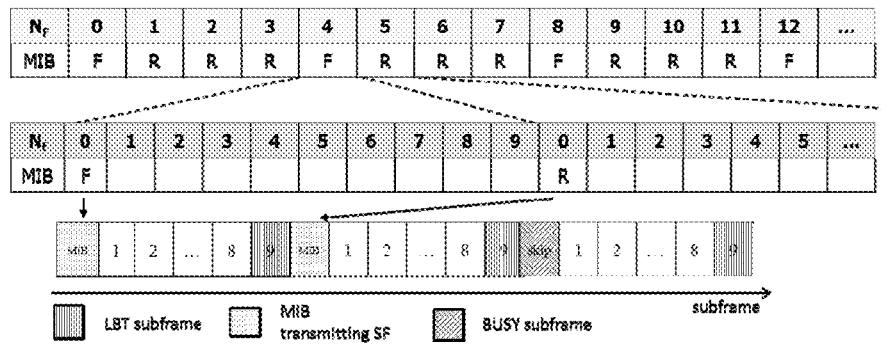
Figure 3F:
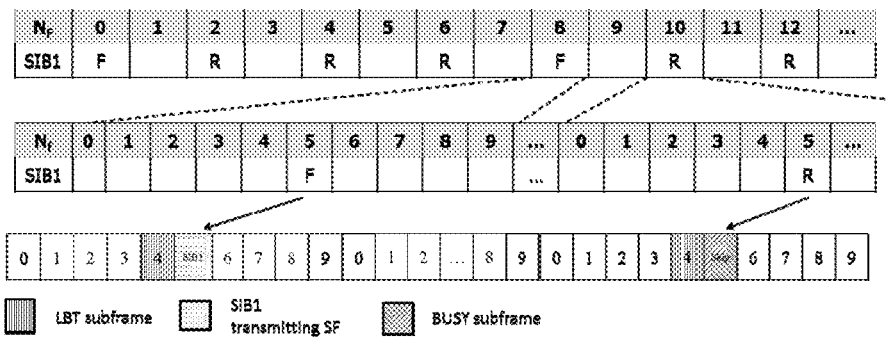

In FIGS. 3e and 3f, another two example are provided, where it is assumed that the at least one signal to be transmitted in step S203 is MIB and SIB1, respectively. The signal transmission patterns illustrated in FIGS. 3e and 3f indicate periodic resources for MIB and SIB1 transmission. In these Figures, "$N_F$" stands for index of radio frame, "$N_f$" stands for index of subframe, "F" denotes the first transmission in each period, and "R" denotes a repetition of the transmission. It can be seen that MIB is assigned a transmission period of 40 ms, wherein the first transmission is scheduled in subframe 0 of radio frames for which the SFN mod 4=0, and repetitions are scheduled in subframe 0 of all other radio frames. Similarly, SIB1 is assigned a transmission period of 80 ms with repetitions made within the 80 ms. The first transmission of SIB1 is scheduled in subframe 5 of radio frames for which the SFN mod 8=0, and repetitions are scheduled in subframe 5 of all other radio frames for which SFN mod 2=0. Similarly as shown in FIGS. 3a-3d, in case a corresponding channel is detected as busy, the transmission of MIB/SIB1 is skipped.

Figure 2C:
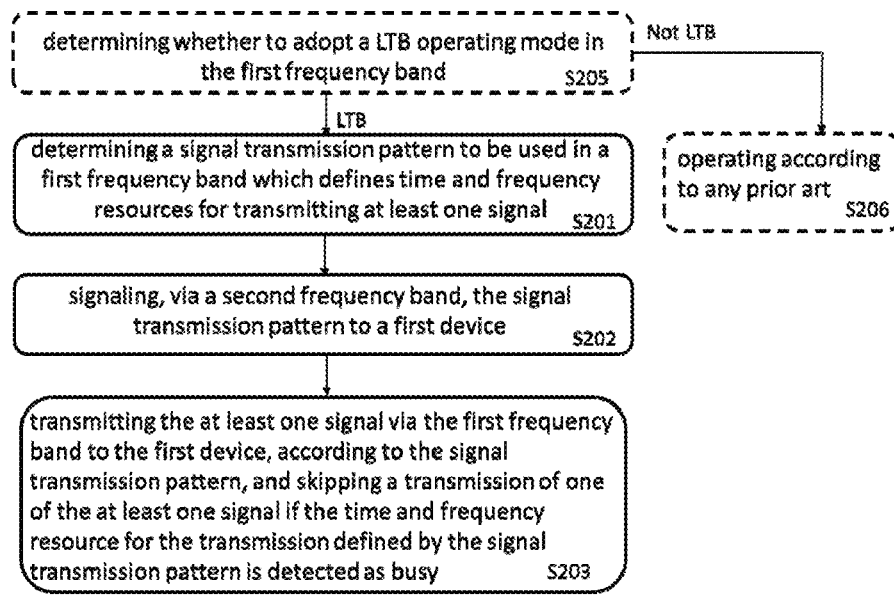
FIG. 2c is a flow chart of a method for signal transmission in a wireless communication network according to still another embodiment of the invention.

In accordance with one embodiment of the invention, the method 200 further comprising a step S205, for determining whether to adopt a listen before talk (LTB) operating mode in the first frequency band; and, only when the LTB mode is determined to be adopted, the steps of S201, S202 and S203 depicted in FIG. 2a are performed; otherwise, performing according to any prior art in step S206, e.g., performing normal operation as defined in current standard (e.g., LTE) for a licensed band. One example is shown in FIG. 2c. In accordance with one embodiment of the invention, determining whether to adopt a listen before talk (LTB) operating mode in the first frequency band is based on regulation for the first frequency band and/or the device's capability, e.g., whether a eNB (a macro eNB 101 and/or a pico eNB 103) is capable of LBT operation.

In one embodiment of the invention, all the steps in the method 200 can be implemented, for example, by the eNB 101 shown in FIG. 1. One exemplary scenario can be that the eNB 101 provides service to a UE 102 via CA, by using both the first and the second frequency bands. In another embodiment of the invention, some steps in the method 200 can be implemented, for example, by the eNB 101 shown in FIG. 1, while other steps are implemented by another network node, e.g., a pico eNB 103 shown in FIG. 1. One exemplary scenario for this can be that the eNB 101 and the eNB 103 provides service to a UE 102 via dual connectivity, by using the first and the second frequency bands, respectively. In one example, steps S201 and S202 can be performed by the eNB 101, while the step S203 (or, steps S203 to S205) is performed by the eNB 103. This may require some signaling exchange between the eNB 101 and 103, however, the inter-eNB interfacing for signaling exchange is well known, and thus details are omitted here. Furthermore, it should be noted that these are just examples, and other implementation can also be possible, e.g., the steps S201, S202 and S205 can be performed by the eNB 101, while the step S203 to S204 are performed by the eNB 103.

Though some specific signal transmission patterns are presented for the CRS/CSI-RS, PSS/SSS, MIB/SIB1, it should be appreciated that the embodiments of the invention are not limited to these signals and the signal transmission patterns, and, any other signals can be transmitted in the first frequency band (e.g., an unlicensed band) following the same principle of method 200.

Figure 4:
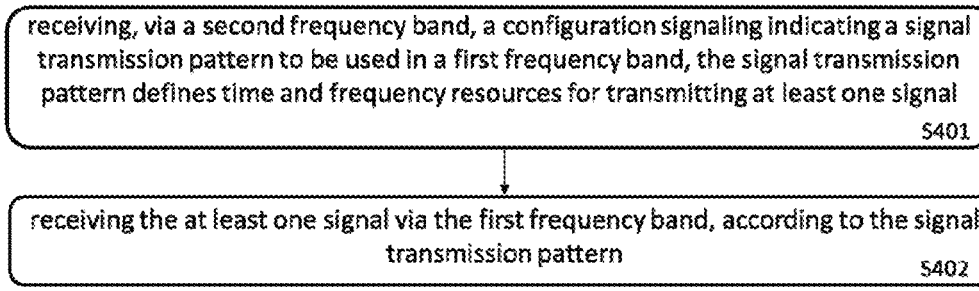
FIG. 4 is a flow chart of a method for signal reception in a wireless communication network according to an embodiment of the invention.

Referring now to FIG. 4, which illustrates a flow chart for an example method 400 for signal reception in a wireless communication network. The method can be implemented, for example, by a UE 102 shown in FIG. 1. The method comprises a step S401, for receiving via a second frequency band (e.g., a licensed frequency band) a configuration signaling indicating a signal transmission pattern to be used in a first frequency band (e.g., an unlicensed frequency band), the signal transmission pattern defines time and frequency resources for transmitting at least one signal; and a step S402, for receiving the at least one signal in the first frequency band, according to the signal transmission pattern.

In accordance with an embodiment of the invention, the at least one signal received in step S402 is a signal transmitted by an eNB in step S203 according to the method 200 described with reference to FIGS. 3a-3f, and/or, the signal transmission pattern received in the step S401 is sent by an eNB in the step S202 according to the method 200 described with reference to FIGS. 2a-2c and 3a-3f. Thus, the features described for the at least one signal and the signal transmission pattern with respect to FIGS. 3a-3f also apply in FIG. 4, and their details will not be repeated here. For example, the signal transmission pattern defines time and frequency resources for one of a periodic transmission, an opportunistic transmission, and a combination thereof; and the at least one signal includes at least one of a reference signal, a synchronization signal, and a control signaling.

In accordance with one embodiment of the invention, the first frequency band and/or the second frequency band comprise(s) multiple carriers. In accordance with another embodiment of the invention, at least one carrier in the first frequency band and at least one carrier in the second frequency band are configured for a device as carrier aggregation or dual connectivity, as described with reference to FIGS. 2a-2c.

In accordance with a further embodiment of the invention, in step S401, the configuration signaling is received from a first apparatus (e.g., a macro eNB 101), while in step S402, the at least one signal is received from a second apparatus (e.g., a pico eNB 103) different from the first apparatus.

To be noted that in some alternative implementations, the method steps indicated in the flow charts could also occur in a sequence different from what is indicated in the figures. For example, two sequentially indicated blocks could be executed substantially in parallel or sometimes in an inversed order, depending on the functions as involved.

It is also to be understood that methods described with reference to FIGS. 2a and 2b can be implemented in various ways, by software, hardware, firmware, or any of their combinations, e.g., a processor, computer programming code stored in a computer readable storage media, etc.

Figure 5A:
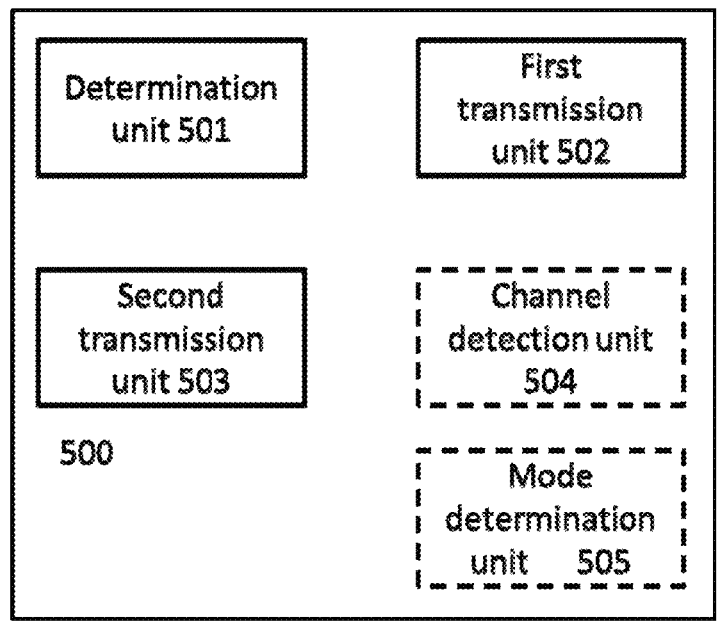
FIG. 5a is a block diagram of a device for signal transmission in a wireless communication network according to an embodiment of the invention.

Reference is now made to FIG. 5a, which illustrates a block diagram of a device 500 for signal transmission in a wireless communication network according to an embodiment of the invention. The device 500 according to FIG. 5a can be an eNB 101 in FIG. 1, and may perform the example methods described with reference to FIGS. 2a-2c, but is not limited to these methods. Then any feature presented above, e.g., in the description with reference to FIGS. 2a-2c can be applied to the device 500 presented below. It is to be noted that the methods described with reference to FIG. 2a may be performed by the device 500 of FIG. 5a but is not limited to being performed by this device 500. The device 500 may also be other network element than the eNB 101 shown in FIG. 1, e.g., in an embodiment of the invention, it can be a relay node, a WLAN AP, etc.

As shown in FIG. 5a, the device 500 comprises a determination unit 501, configured for determining a signal transmission pattern which defines time and frequency resources for transmitting at least one signal in a first frequency band (e.g., an unlicensed frequency band); a first transmission unit 502, configured for signaling via a second frequency band (e.g., a licensed frequency band) the signal transmission pattern to a first device; and a second transmission unit 503, configured for transmitting the at least one signal via the first frequency band, to the first device, according to the signal transmission pattern and skipping a transmission of one of the at least one signal if time frequency resource for the transmission defined by the signal transmission pattern is detected as busy.

In accordance with one embodiment of the invention, the first frequency band and/or the second frequency band comprise(s) multiple carriers. In accordance with another embodiment of the invention, at least one carrier in the first frequency band and at least one carrier in the second frequency band are configured for the first device as carrier aggregation or dual connectivity.

In accordance with one embodiment of the invention, the units 501 to 503 are configured for performing the steps 201 to 203 described with reference to FIGS. 2a-2c, respectively.

In another embodiment of the invention, the determined signal transmission pattern by the determination unit 501 can define time and frequency resources for one of a periodic transmission, an opportunistic transmission, and a combination thereof. For example, the signal transmission pattern can be any of the patterns described with reference to FIGS. 3a to 3f, but is not limited to this.

According to one embodiment of the invention, the at least one signal transmitted by the second transmission unit 503 includes at least one of a reference signal, a synchronization signal, and a control signaling. For example, the at least one signal can be a CRS/CSI-RS, a PSS/SSS, and/or MIB/SIB1 as illustrated in FIGS. 3a-3f.

In one embodiment of the invention, the device 500 further comprises a channel detection unit 504, configured for performing channel detection in the first frequency band before transmitting each of the at least one signal, and the second transmission unit 503 is further configured for determining whether to skip a transmission of one of the at least one signal based on the channel detection results obtained by the channel detection unit 504. In another embodiment of the invention, the second transmission unit 503 is further configured for skipping a transmission of one of the at least one signal if the corresponding channel is detected as busy by the channel detection unit 504; and the channel detection unit 504 is further configured for continuing the channel detection in the corresponding time and frequency resource for the skipped transmission defined by the signal transmission pattern. Such implementation is due to a consideration that to avoid in-device interference and reduce implementation complexity, concurrent transmission and reception in same frequency band should be prevented. Correspondingly, when the second transmission unit 503 is transmitting in the first frequency band, the channel detection unit 504 is not allowed to perform channel detection in same frequency band; on the other hand, once the channel is detected as busy and the second transmission unit is not allowed to transmit, i.e., a transmission defined by the signal transmission pattern will be skipped, the subframe corresponding to the skipped transmission can be used for channel detection by the channel detection unit 504, according to the embodiment of the invention.

In another embodiment of the invention, the channel detection unit 504 is not configured for performing channel detection in the first frequency band before transmitting each of the at least one signal. Instead, the channel detection unit 504 is configured for providing a prediction on a time duration unavailable/available for the signal transmission. That is, if the channel detection indicates that a channel in the first frequency band will be idle for a period of P ms, then a signal can be transmitted by the second transmission unit 503 according to the signal transmission pattern within the P ms without additional channel detection performed by the channel detection unit 504 between each transmission. In case the channel detection indicates that the first frequency band keep busy for a period of P ms, then the second transmission unit 503 will be configured for skipping all the transmission of a signal defined the signal transmission pattern within the P ms, without additional channel detection performed by the channel detection unit 504 before each skipping.

In still another embodiment of the invention, the channel detection may be performed by a separate device rather than the channel detection unit 504 in an eNB. For example, the channel detection can be done by a UE, which reports the detection results to the eNB based on certain configuration. In a further embodiment, the channel detection may be performed by a Wi-Fi Station or AP connected to the eNB. In such case, the device 500 may further include a receiving unit not shown in FIG. 5a, for receiving the channel detection results for the first frequency band.

In one embodiment of the invention, the time and frequency resource for the transmission of the one of the at least one signal is detected as busy when received signal power on the same frequency resource is above a threshold, the threshold is configurable, determined based on a receiver sensitivity, or fixed. In one embodiment of the invention, the threshold can be determined by the eNB based on its receiver sensitivity. In another embodiment of the invention, the threshold can be set as a fixed value, e.g., −62 dBm as in 802.11.

In one further embodiment of the invention, the device further comprises a mode determination unit 505, configured for determining whether to adopt a listen before talk LTB operating mode in the first frequency band; and only when the mode determination unit 505 determines that LTB mode is determined to be adopted, the units of 501 to 504 are configured to perform corresponding functions as described above; otherwise, performing according to any prior art, e.g., performing normal operation as defined in current standard (e.g., LTE) for a licensed band. In accordance with one embodiment of the invention, determining whether to adopt a listen before talk (LTB) operating mode in the first frequency band is based on regulation for the first frequency band and/or the device's capability, e.g., whether a eNB (a macro eNB and/or a pico eNB) is capable of LBT operation.

Figure 5B:
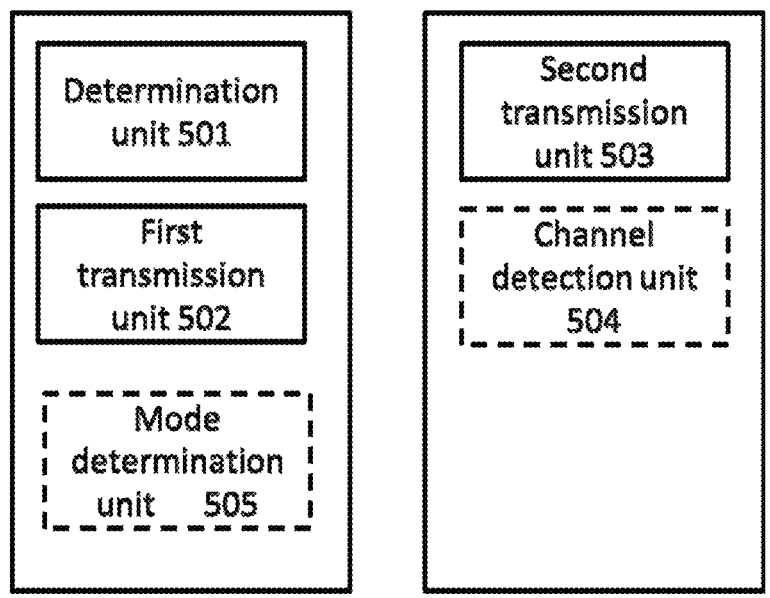
FIG. 5b is a block diagram of a distributed device for signal transmission in a wireless communication network according to another embodiment of the invention.

In accordance with another embodiment of the invention, all the units 501 to 505 are implemented in a same device, e.g., a eNB 101 as shown in FIG. 1. In another embodiment of the invention, some of the units 501 to 505 are implemented in a device, while other units are implemented in another device, that is, the device 500 is a distributed system. One example of such embodiments is shown in FIG. 5b, wherein the units 501 and 502 (or, 501, 502 and 505) are implemented in a macro eNB 101, while the unit 503 (or, both 503 and 504) is implemented in a pico eNB 103. However, the example in FIG. 5b is just for illustrative purpose, it can be appreciated that other arrangement of the distributed device 500 is also possible. For example, all the units 503 to 505 may be implemented in a same device, e.g., in a small cell eNB. These example embodiments can be implemented, for example, in a scenario where the eNB 101 and the eNB 103 provides service to a UE 102 via dual connectivity, by using the first and the second frequency bands, respectively. It can be easily appreciated that in such case, there can be other additional units implemented in the eNB 101 and the eNB 103, e.g., for signaling exchange between them, however, since the inter-eNB interfacing for signaling exchange is well known, the details are omitted here.

It should be noted that though in some embodiments the first frequency band is an unlicensed frequency band and the second frequency band is a licensed frequency band, the embodiments of the invention are not limited to this. The device 500 can be applied in any other scenarios, e.g., where both the first and the second frequency bands are licensed or unlicensed bands. One example can be that the second frequency band is a primary carrier dedicated for one cell, while the first frequency band is a shared carrier available to multiple cells or multiple networks/operators, and then for any transmission in the first frequency band, the eNB can follow the principles described above to avoid/reduce interference from/to other cells/wireless systems.

Figure 6:
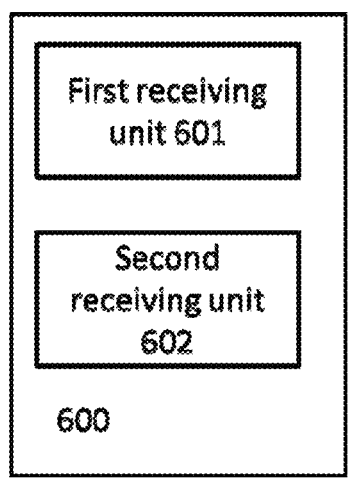
FIG. 6 is a block diagram of a device for signal reception in a wireless communication network according to an embodiment of the invention.

Reference is now made to FIG. 6, which illustrates a block diagram of a device 600 for signal reception in a wireless communication network. In accordance with one embodiment of the invention, the device 600 comprises a first receiving unit 601, configured for receiving via a second frequency band a configuration signaling indicating a signal transmission pattern to be used in a first frequency band, the signal transmission pattern defines time and frequency resources for transmitting at least one signal; and a second receiving unit 602, configured for receiving the at least one signal via the first frequency band, according to the signal transmission pattern.

According to one embodiment of the invention, the device 600 may perform the example methods described with reference to FIGS. 2a-2c but is not limited to these methods. Then any feature presented above, e.g., in the description with reference to FIGS. 2a-2c, if appropriate, can be applied to the device 600 presented below. It is to be noted that the methods described with reference to FIGS. 2a-2c may be performed by the device 600 of FIG. 6 but is not limited to being performed by this device 600. The device 600 may be, for example, a UE 102 shown in FIG. 1.

In accordance with an embodiment of the invention, the at least one signal received by the second receiving unit 602 is a signal transmitted by eNB in step 203 according to the method 200 described with reference to FIGS. 2a-2c and 3a-3f, and/or, the signal transmission pattern received by the first receiving unit 601 is sent by an eNB in step 202 according to the method 200 described with reference to FIGS. 2a-2c and 3a-3f. Thus, the features described for the at least one signal and the signal transmission patterns described with respect to FIGS. 2a-2c and 3a-3f also apply in FIG. 6, and their details will not be repeated here. For example, the signal transmission pattern defines time and frequency resources for one of a periodic transmission, an opportunistic transmission, and a combination thereof; and the at least one signal includes at least one of a reference signal, a synchronization signal, and a control signaling.

In accordance with one embodiment of the invention, the signal transmission pattern is received by the first receiving unit 601 via a licensed band to guarantee satisfying performance, while the at least signal is received by the second receiving unit 602 via an unlicensed band; but the embodiments of the invention are not limited to this.

In accordance with one embodiment of the invention, the first frequency band and/or the second frequency band comprise(s) multiple carriers. In accordance with another embodiment of the invention, at least one carrier in the first frequency band and at least one carrier in the second frequency band are configured for the UE 102 as carrier aggregation or dual connectivity, as described with reference to FIGS. 2a-2c.

In accordance with a further embodiment of the invention, in receiving unit 601, the configuration signaling is received from a first apparatus (e.g., a macro eNB 101), while in receiving unit 602, the at least one signal is received from a second apparatus (e.g., a pico eNB 103) different from the first apparatus.

The flow charts and block diagrams in the figures illustrate the likely implemented architecture, functions, and operations of the system, method, and apparatus according to various embodiments of the present invention. In this point, each block in the flow charts or block diagrams could represent a part of a module, a program segment, or code, where the part of the module, program segment, or code comprises one or more executable instructions for implementing a prescribed logic function. It can be appreciated that the methods and devices may comprise other steps/functional blocks besides those illustrated. It should also be noted that each block in a block diagram and/or a flow chart, and a combination of the blocks in the block diagram and/or flow chart could be implemented by software, hardware, firmware, or any of their combinations. Furthermore, it should be understood that in some embodiments, function of a block can also be implemented by multiple blocks, and functions of multiple blocks shown in FIGS. 5a, 5b and 6 may also be implemented by a single block in other embodiments.

The example embodiments can store information relating to various processes described herein, e.g., store the channel detection results, the received signal transmission pattern etc. The components of the example embodiments can include computer readable storage medium or memories according to the teachings of the present inventions and for holding data structures, tables, records, and/or other data described herein, or the program codes for implementing any of the methods according to the embodiments of the invention.

While the present inventions have been described in connection with a number of example embodiments, and implementations, the present inventions are not so limited, but rather cover various modifications, and equivalent arrangements, which fall within the purview of prospective claims. It is also obvious to a person skilled in the art that with the advancement of technology, the basic idea of the invention may be implemented in various ways. The invention and its embodiments are thus not limited to the examples described above; instead they may vary within the scope of the claims.

What is claimed is:

1. A method in a wireless communication network performed by a user equipment (UE), the method comprising:
    receiving configuration information from a base station via a second spectrum, wherein,
        the second spectrum is a licensed spectrum, and
        the configuration information comprises a first parameter indicating a periodicity, in milliseconds (ms), of a first signal and
        a second parameter indicating an offset, for the first signal, given in a number of subframes; and
    receiving the first signal on a first spectrum, wherein
        a channel on the first spectrum is sensed to be idle by the base station before each transmission of the first signal, and
        the first spectrum is an unlicensed spectrum,
    wherein the channel on the first spectrum is sensed to be idle by:
    sensing whether the channel is idle in a next time duration,
        if the channel is not sensed to be idle in a time duration after transmission of the first signal is ready, or
        if the channel is not sensed to be idle in any of time durations within a time period immediately before transmission of the first signal.

2. The method of claim 1, further comprising:
    if the channel is sensed to be busy, receiving the first signal via the first spectrum after the channel is sensed to be idle.

3. The method of claim 1,
    wherein the time period includes consecutive time durations.

4. A method in a wireless communication network performed by a base station, the method comprising:
    transmitting configuration information to a user equipment (UE), via a second spectrum, wherein,
        the second spectrum is a licensed spectrum, and
        the configuration information comprises a first parameter indicating a periodicity, in milliseconds (ms), of a first signal and a second parameter indicating an offset, for the first signal, given in a number of subframes; and
    transmitting the first signal on a first spectrum, after sensing a channel on the first spectrum to be idle before each transmission of the first signal, wherein the first spectrum is an unlicensed spectrum,
    wherein the channel on the first spectrum is sensed to be idle by:
    sensing whether a channel is idle in a next time duration,
        if the channel is not sensed to be idle in a time duration after transmission of the first signal is ready, or
        if the channel is not sensed to be idle in any of time durations within a time period immediately before the transmission of the first signal.

5. The method of claim 4, further comprising:
    if the channel is sensed to be busy, transmitting the first signal via the first spectrum to the UE after the channel is sensed to be idle.

6. The method of claim 4,
    wherein the time period includes consecutive time durations.

7. The method of claim 4,
    wherein the first signal includes at least one of:
        a cell-specific reference signal (CRS);
        a channel state information reference signal (CSI-RS);
        a primary synchronization signal (PSS); or
        a secondary synchronization signal (SSS).

8. A base station in a wireless communication network, comprising a processor and a memory storing instructions to:
    transmit configuration information to a user equipment (UE) via a second spectrum, wherein,
        the second spectrum is a licensed spectrum, and
        the configuration information comprises a first parameter indicating a periodicity, in milliseconds (ms), of a first signal and a second parameter indicating an offset, for the first signal, given in a number of subframes; and
    transmit the first signal on a first spectrum, after sensing a channel on the first spectrum to be idle before each transmission of the first signal, wherein the first spectrum is an unlicensed spectrum,
    wherein the controller is further configured to:
    sense whether a channel of the first spectrum is idle in a next time duration,
        if the channel is not sensed to be idle in a time duration after transmission of the first signal is ready, or
        if the channel is not detected to be idle in any of time durations within a time period immediately before the transmission of the first signal.

9. The base station of claim 8, wherein the transceiver is further configured to:
    if the channel is sensed to be busy, transmit the first signal via the first spectrum to the UE after the channel is sensed to be idle.

10. The base station of claim 8,
    wherein the time period includes consecutive time durations.

11. The base station of claim 8, wherein the controller is further configured to:
    sense the channel of the first spectrum before transmitting each of the first signal; and
    determine whether to transmit each of the first signal based on sensed results.

12. The method of claim 1,
    wherein the first signal includes at least one of:
        a cell-specific reference signal (CRS);
        a channel state information reference signal (CSI-RS);
        a primary synchronization signal (PSS); or
        a secondary synchronization signal (SSS).

* * * * *